US008995654B2

(12) United States Patent
Tang et al.

(10) Patent No.: US 8,995,654 B2
(45) Date of Patent: Mar. 31, 2015

(54) METHOD FOR VERIFYING CORRECT ENCRYPTION KEY UTILIZATION

(75) Inventors: John Sui-kei Tang, Costa Mesa, CA (US); Larry Dean Hofer, Costa Mesa, CA (US); David Lawson, Costa Mesa, CA (US)

(73) Assignee: Emulex Corporation, Costa Mesa, CA (US)

(*) Notice: Subject to any disclaimer, the term of this patent is extended or adjusted under 35 U.S.C. 154(b) by 1148 days.

(21) Appl. No.: 12/474,166

(22) Filed: May 28, 2009

(65) Prior Publication Data

US 2010/0306635 A1  Dec. 2, 2010

(51) Int. Cl.
*H04L 9/32* (2006.01)
*H04L 9/08* (2006.01)
*H03M 13/09* (2006.01)

(52) U.S. Cl.
CPC .............. *H04L 9/083* (2013.01); *H04L 9/0822* (2013.01); *H04L 9/0894* (2013.01); *H03M 13/09* (2013.01)
USPC ............................................ 380/44; 380/277

(58) Field of Classification Search
USPC ....................................................... 380/279
See application file for complete search history.

(56) References Cited

U.S. PATENT DOCUMENTS

| 6,163,859 | A  | * | 12/2000 | Lee et al. ................... 714/38.14 |
| 6,968,459 | B1 | * | 11/2005 | Morgan et al. ................ 713/189 |
| 8,005,227 | B1 | * | 8/2011  | Linnell et al. ................ 380/279 |
| 2006/0133617 | A1 | * | 6/2006 | Minamizawa ............... 380/286 |
| 2007/0014396 | A1 | * | 1/2007 | Miyauchi et al. ............. 380/28 |

* cited by examiner

*Primary Examiner* — David Le
(74) *Attorney, Agent, or Firm* — McAndrews, Held & Malloy, Ltd.

(57) ABSTRACT

A method for sending encrypted data in response to a request for an I/O operation. The method includes the steps of requesting a data encryption key, the request including one or more identifiers unique to the I/O operation; receiving a data encryption key attached with a first key use fingerprint, independently generating a second key use fingerprint in response to the one or more identifiers; comparing the first and the second key use fingerprints; and if the first key use fingerprint matches the second key use fingerprint, using the data encryption key to encrypt the data to be sent. In one embodiment, the one or more identifiers include at least one of a target identifier, a LUN identifier, and a LBA range identifier.

69 Claims, 7 Drawing Sheets

METHOD FOR VERIFYING CORRECT ENCRYPTION KEY UTILIZATION

FIELD OF THE INVENTION

This invention relates generally to data encryption and more specifically to methods for verifying that the correct data encryption key is used to encrypt data to be transmitted over an unsecured network.

BACKGROUND OF THE INVENTION

Data encryption and decryption techniques are widely used to securely transmit sensitive information over a network. Many encryption algorithms use encryption keys to transform data into an encrypted format before sending the encrypted data over the network. Encrypted data is typically unreadable and meaningless unless it can be decrypted by the recipient. As such, it is essential to make sure that the key used for encryption/decryption is the correct intended key.

During the course of the data encryption process, there are several areas in the chain of operational procedures where a wrong data encryption key (DEK) can be introduced and used to encrypt data. As a result, the encrypted data may be corrupted and irrecoverable. Typically, the wrong data encryption key may be introduced in one of three common operational procedures. First, a data encryption key may be corrupted in the data transfer process from a source to a destination over a network. This type of corruption may be avoided by using the well-known Advanced Encryption Standard (AES) key_wrap/un_wrap algorithm that employs an integrity checking mechanism for detecting key corruption during transmission and unwrapping operational procedures.

In addition, an incorrect data encryption key may be issued by the driver or other components of the source device responsible for issuing and maintaining data encryption keys. Similarly, an incorrect data encryption key may be retrieved from a local cache memory of the encrypting device (HBA) in which the data encryption key is temporarily stored. Currently, there is no existing method designed to verify that the correct data encryption keys in the encrypting device is used.

SUMMARY OF THE INVENTION

As discussed previously, data corruption can occur during a data encryption procedure as a result of the wrong data encryption key (DEK) being issued for a particular input/output (I/O) operation. Embodiments of the invention provide a method for verifying data encryption keys by including, with each key, data that may be used to determine whether the key is the appropriate key for a particular I/O operation. In this document, the data associated with each data encryption key is referred to as a key use fingerprint of the data encryption key. Each key use fingerprint may be generated from one or more identifiers that identify the desired use of the key.

In one embodiment, a data encryption key verification process is provided. First, the server makes a key request to the key management server for a data encryption key and also provides a set of I/O target information that is to be associated with the key. In response to the request, the key management server generates a data encryption key and also creates a key use fingerprint based on the I/O target identifying information in the key request. The key management server then wraps the data encryption key using a key wrapping algorithm such as the AES key wrap algorithm and stores the wrapped key with key use fingerprint in a key blob. The key blob containing the encrypted data encryption key and a copy of unencrypted key use fingerprint is then delivered by the key management server to the server and stored in the memory of the server.

After receiving the data encryption key from the key management server, the driver on the server then issues a command to the HBA to initiate the I/O operation. Included in the command is target information identifying the target device to which the data will be sent, data information identifying the location of the data to be sent, and a key pointer identifying the location of the data encryption key to be used to encrypt the data. The HBA locates the key blob in the server memory based on the key pointer. The data encryption key can be unwrapped using an unwrapping algorithm such as the AES key unwrap algorithm. In addition, the key use fingerprint can also be extracted from the blob. To verify that the unwrapped data encryption key is the correct key for the I/O operation, the HBA independently creates a second key use fingerprint from the target information received in the command from the driver. By comparing the key use fingerprint extracted from the key blob and the key use fingerprint created from the target information in the command, the HBA can determine whether the data encryption key is correct. The data information specifies to the HBA where to obtain the data from the server. If the two key use fingerprints match, the HBA proceeds with the I/O operation by encrypting the outgoing data with the data encryption key that it has unwrapped. Finally, the encrypted data is sent over the network fabric to the target device as defined in the I/O operation. The key use fingerprint checking is performed every time a data encryption key is to be used to encrypt or decrypt data.

It is essential that the unwrapping of the data encryption key be performed the very first time any key is used to encrypt the outgoing data. After a key has been unwrapped, it can be stored in the local cache inside the HBA along with the associated key use fingerprint. Subsequent encryption process using the same key then only needs to compare the generated key use fingerprint with the key use fingerprint that is stored along with the key to verify if the key specified by the driver is correct. Embodiments of the invention provide a method of protecting the data encryption key that is going to be used in the data transmission. More specifically, the embodiments utilize three parameters uniquely identifying the target device of the transmission to verify whether the data encryption key is corrupted before the data encryption key is used to encrypt the actual data. This disclosed method allows data to be protected from the originating server to the target device. The process is transparent to the driver and anything between where the key is generated (e.g., the key management server) and where the key is used (e.g., the HBA). Because the key use fingerprint is entrusted with information that is already possessed by the driver, there may not be a need for the driver to fetch additional information. Thus, it also minimizes the involvement of any DMA on the server by eliminating one or more DMA cycles from the I/O operations.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

As discussed previously, data corruption can occur during a data encryption procedure as a result of the wrong data encryption key (DEK) being issued for a particular input/output (I/O) operation. Embodiments of the invention provide a method for verifying data encryption keys by including, with each key, data that may be used to determine whether the key is the appropriate key for a particular I/O operation. In this document, the data associated with each data encryption key is referred to as a key use fingerprint of the data encryption key. Each key use fingerprint may be generated from one or more identifiers that identify the desired use of the key.

Figure 1:
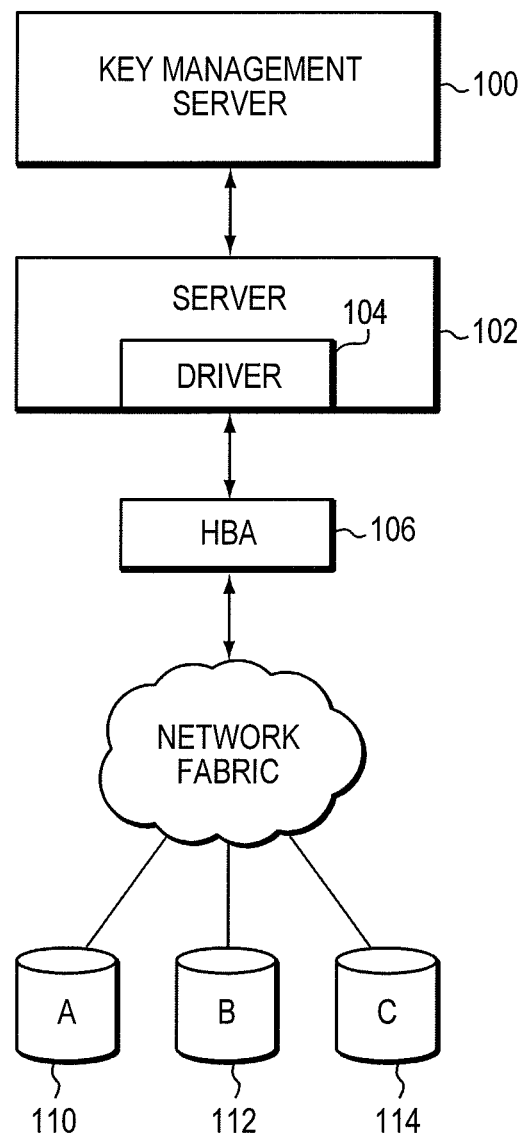
FIG. 1 is a block diagram illustrating a network capable of handling the transmission of encrypted data.

FIG. 1 illustrates an exemplary network suitable for handling encrypted data communications. As illustrated, the network may be a Fibre Channel storage network including a key management server 100, a server 102, a host bus adapter (HBA) 106, a network fabric 108, and a plurality of storage devices 110, 112, 114. The key management server 100 is in communication with the server 102. The server 102 includes a driver 104 for the HBA 106, which serves as a network interface for the server 102, connecting the server 102 to the network fabric 108. Typically, the HBA 106 is a part of the server 102, but is shown as a separate component in FIG. 1 to better illustrate its interactions with the server 102 and the driver 104. The HBA 106 may include its own firmware. The server 102 is connected, through the network fabric 108, to the multiple storage devices 110, 112, 114 on the network. The storage devices 110, 112, 114 may, for example, be external hard disks or remote databases.

Although the network of FIG. 1 is described as being capable of transmitting encrypted data communications, it should be understood that not all data communications over the network has to be encrypted. For example, the only encrypted data communications may be communications between the server 100 and one of the storage devices 110, 112, 114 (e.g., storage device B 112). To transmit encrypted data to storage device B 112, the server 102 first needs to obtain a data encryption key from the key management server 100. The key management server 100 is mainly responsible for creating, archiving, and managing data encryption keys. Once the server 102 receives a data encryption key from the key management server 100, the driver 104 in the server 102 instructs the HBA 106 to locate the data to be transmitted and encrypt the data using the received data encryption key. Accordingly, the HBA 106 may proceed to encrypt the data using any suitable encryption algorithm before sending the encrypted data over the network to the target, e.g., storage device B 112.

Figure 2:
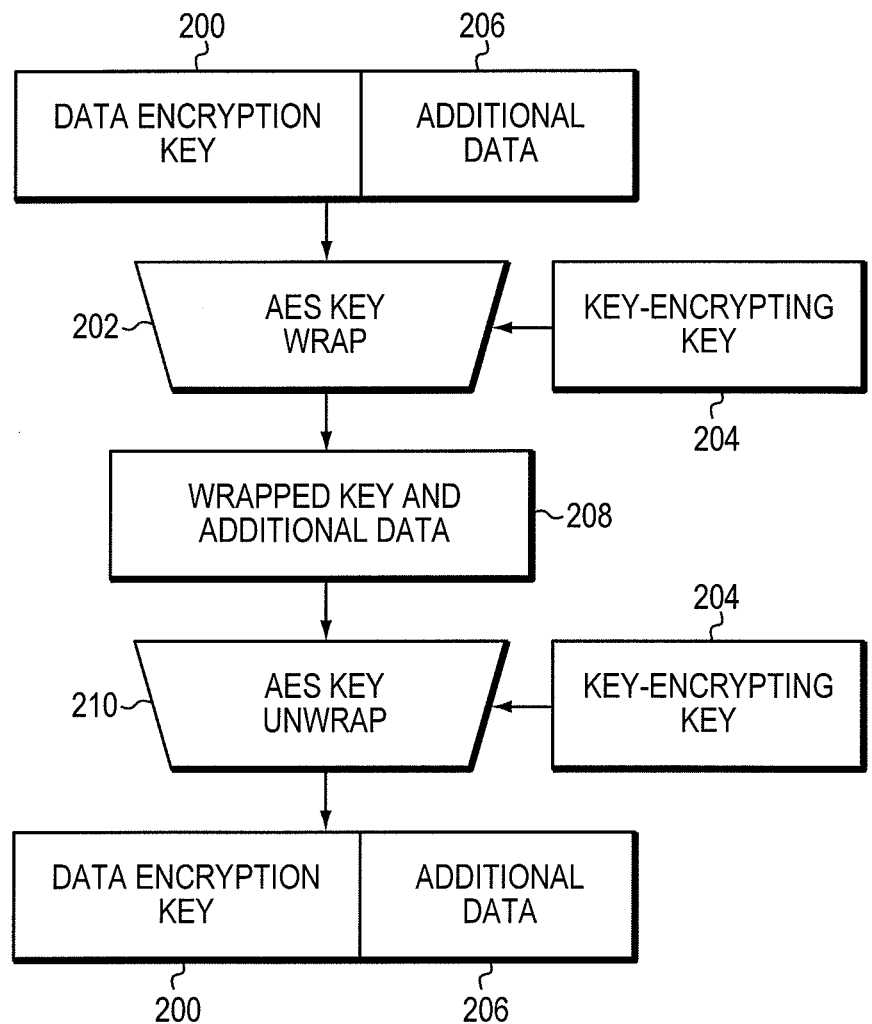
FIG. 2 illustrates the exemplary steps of an encryption/decryption process for encrypting or decrypting a data encryption key.

To ensure that the data encryption key is securely sent to the server 102, the key management server 100 may also encrypt the data encryption key. It should be understood that the encryption of the data encryption key is a different process from the encryption of the actual data to be sent over the network. An exemplary encryption process for the data encryption key is illustrated in FIG. 2. The data encryption key 200 may be a clear text key or any other type of key suitable for encrypting the actual data to be transmitted over the network. The data encryption key 200 is first wrapped (i.e., encrypted) by a key wrap module 202. The key wrap module may apply the Advanced Encryption Standard (AES) key wrap algorithm to encrypt the data encryption key 200. The AES key wrap algorithm is a Federal Information Processing Standard (FIPS) approved encryption algorithm for protecting keys in unsecured storage and/or transmitting keys over an unsecured communications network. It is designed to encapsulate cryptographic key material. As illustrated in FIG. 2, the key wrap module 202 may require a second key, the key-encryption key (KEK) 204, to encrypt the data encryption key 200. It should be understood that other suitable encryption algorithms may replace the AES key wrap algorithm in this step to encrypt the data encryption key 200.

Typically, additional data 206 is attached to the data encryption key 200. Such additional data 206 may be used to check the integrity of the data encryption key 200. For example, the additional data 206 may be a 64-bit integrity check value (ICV). The additional data 206, such as an ICV, is encrypted along with the plain text key and forms the encrypted data encryption key. The encrypted data encryption key along with a copy of the original unencrypted additional data are stored together in a key blob 208, which is then passed on from the key management server to the server and then to the HBA. When the HBA receives the key blob 208, the HBA unwraps the encrypted (wrapped) data encryption key using a key unwrap module 210 which may employ the AES key unwrap algorithm. Other unwrapping algorithms may be used depending on the wrapping algorithm employed during the earlier encryption process. In this example, the AES key unwrap algorithm, using the same key-encryption key 204, may recover the original data encryption key 200 and the additional data wrapped in the key blob 208. The recovered additional data is then compared with the copy of the additional data from the key blob to verify if the unwrapping process has been successful. The key blob 208 is typically discarded after the unwrapping procedure.

However, once the data encryption key 200 is unwrapped and stored in the encrypting device (HBA), there is no existing measure to make sure that the correct data encryption key 200 is used in the I/O operation for which it was requested. As previously mentioned, the data encryption key 200 can be corrupted in a number of different ways. For example, the driver may mix up different data encryption keys and specify the wrong one for a particular I/O operation. If the I/O data is encrypted using an incorrect data encryption key, the receiving device may not be able to decrypt the data using the correct data encryption key. As a result, the encrypted data may never be recovered at the receiving device.

To ensure that the appropriate data encryption key is used to encrypt the I/O data, embodiments of the invention include with each data encryption key, in the encrypted portion of the wrapped key, data that may be used to determine whether the data encryption key is the appropriate key to use with a particular I/O operation. The data associated with the data encryption key in the various embodiments of the invention is a key use fingerprint that is in addition to the additional data that is commonly attached to the data encryption key in the key-encryption process described above.

Figure 3:
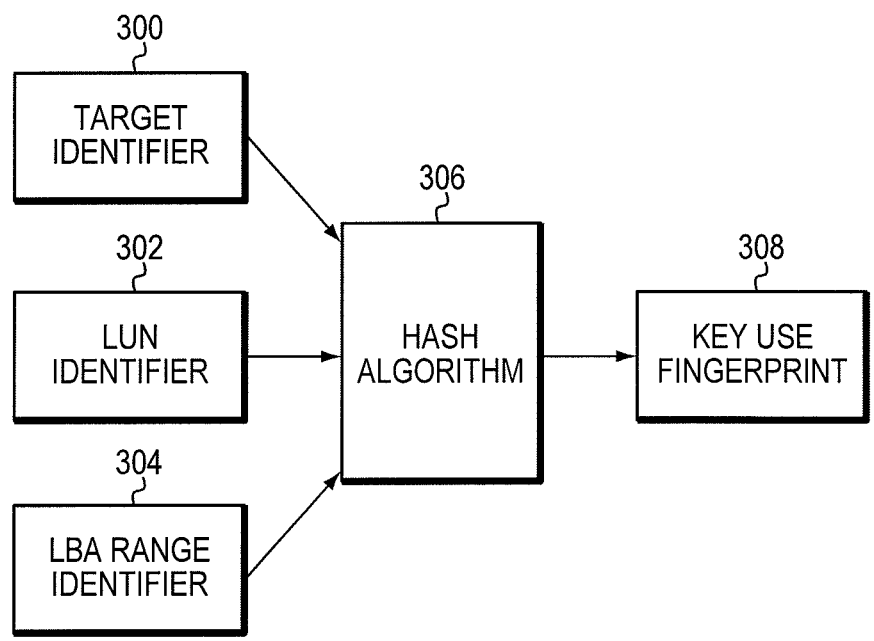
FIG. 3 is illustrates an exemplary process of creating a key use fingerprint according to an embodiment of the invention.

The key use fingerprint is essentially a value associated with a data encryption key and can be constructed from information provided with each I/O operation. In one embodiment, the key use fingerprint may be generated from a set of unique parameters associated with the particular I/O operation. For example, for any I/O operation involving transmitting data over the network, a target device has to be identified so that the server knows where to send the data. As illustrated in FIG. 1, any one of the storage devices 110, 112, 114 on the network may be the target device for the particular I/O operation. The driver 104 in the server 102 may rely on a combination of certain unique parameters to identify the target storage device. Referring to FIG. 3, those parameters may include a target identifier 300, a logical unit number (LUN) identifier 302, and a logical block address (LBA) range identifier 304. The target identifier 300 may be a unique identifier associated with the target. For example, the target identifier 300 may be a world wide port name for a device on a Fibre Channel network or a SAS address of a device on a SAS network. Inside each target device there may be multiple logical devices, each identified by a unique LUN identifier 302. The LUN identifier 302 may be a conventional 8-byte number. Alternatively, the LUN identifier 302 may be truncated to only include the upper 16 bits because the lower 48 bits of the LUN identifier 302 are seldom used. The LBA Range identifier 304 may be an integer associated with the particular LBA range within which the I/O falls (e.g., the starting LBA value of the range).

The target identifier 300, the LUN identifier 302, and the LBA range identifier 304 can be inputted into a hash function 306 to generate a key use fingerprint 308 that is reasonably unique for the particular I/O operation. In one embodiment, the target identifier 300 and the LUN identifier 302 are first concatenated to generate an intermediate identifier (not shown), which is then inputted into the hash function 306. Optionally, the hashed intermediate identifier is concatenated with the LBA range identifier 304 to generate the key use fingerprint 308. The hash function 306 may be made available to both the key manager and the encrypting device (HBA). In another embodiment, instead of using a hash function 306, a cyclic redundancy check (CRC) algorithm can be used to generate the key use fingerprint 308. For example, the key use fingerprint 308 can be created by concatenating the target identifier 300 and the LUN identifier 302, and then calculating a 32-bit CRC from the result. The starting LBA range 304, padded with leading 0's to 32 bits, can then be concatenated to the CRC, generating a 64-bit number. It should be understood that other suitable algorithms or methods can also be used to generate the key use fingerprint 308. It should also be understood that if the same data encryption key is to be used for several different I/O operations identified by different combinations of target identifier, LUN identifier, and LBA range, the key management server may need to wrap the same data encryption key separately for each I/O operation.

Figure 4:
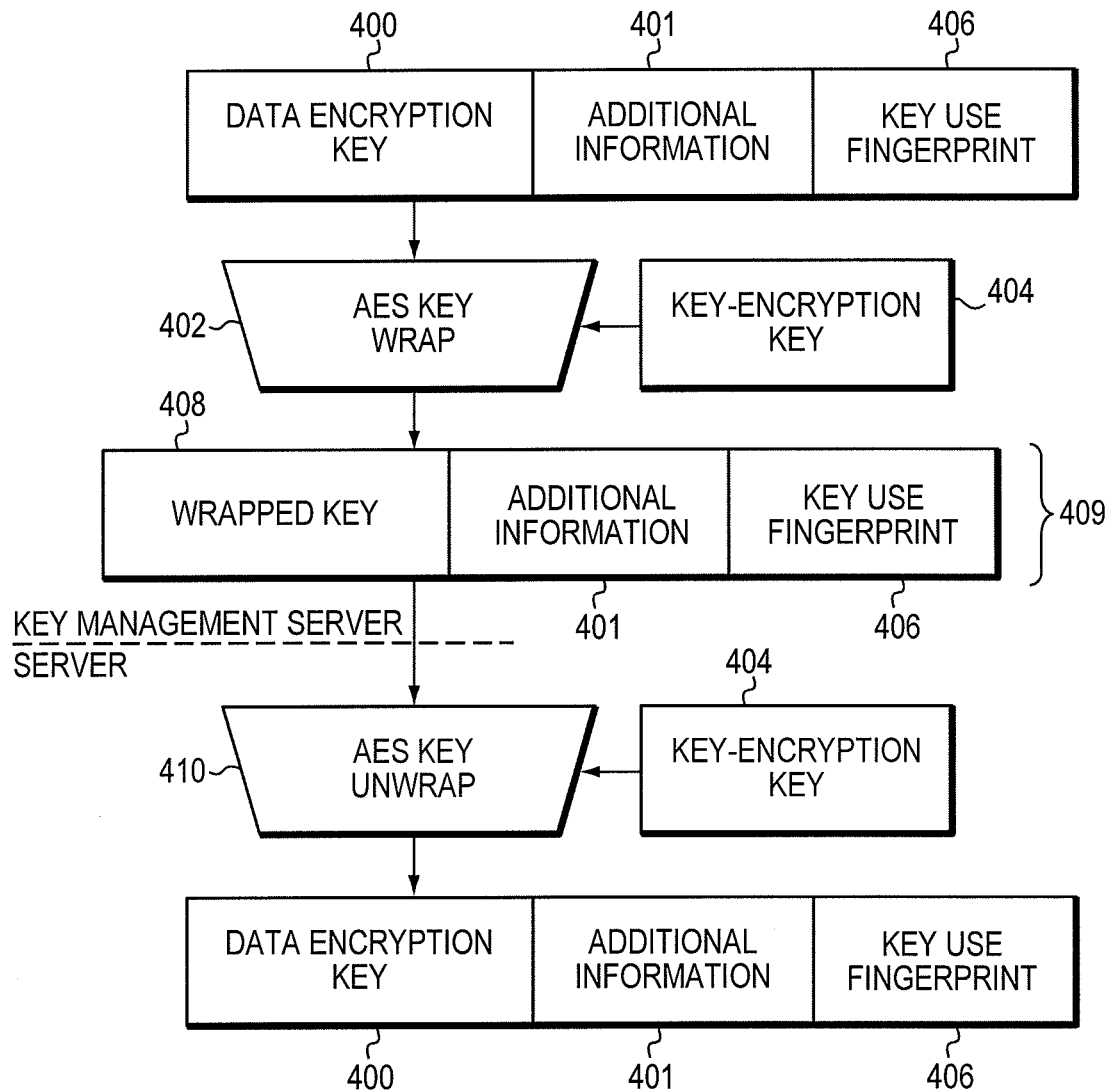
FIG. 4 illustrates an exemplary process of encrypting and decrypting a data encryption key appended with a key use fingerprint according to an embodiment of the invention.
Figure 5:
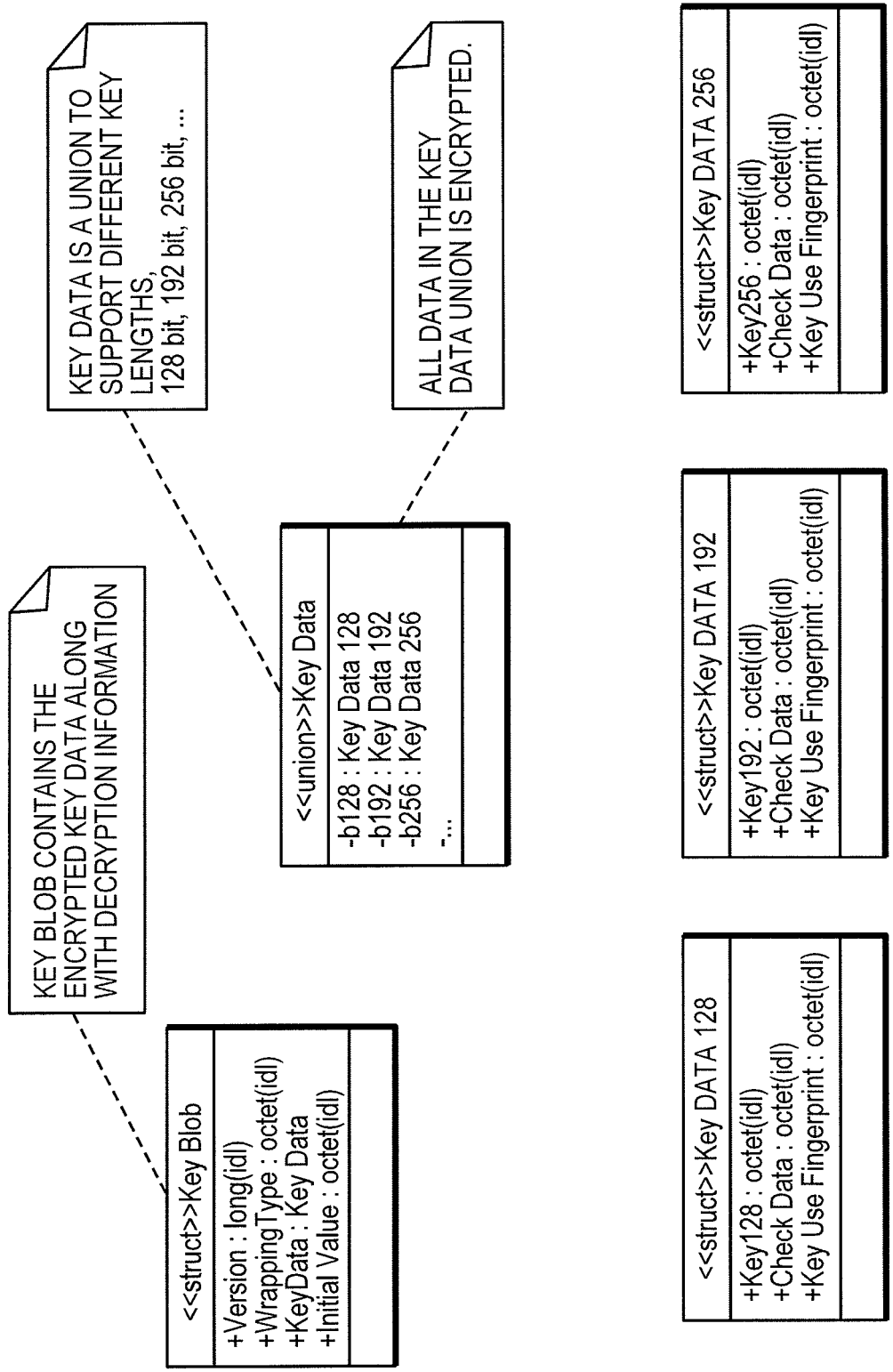
FIG. 5 illustrates an exemplary structure of a key blob according to embodiments of the invention.

Referring to FIG. 4, once generated, the key use fingerprint 406 can be attached to a data encryption key 400. There may also be additional information 401 attached to the data encryption key 400. Similar to the process illustrated in FIG. 2, the data encryption key 400 may be wrapped (i.e., encrypted) using the AES key wrap algorithm 402 with a key-encryption key 404 to generate a wrapped key 408. It should be understood that other suitable encryption algorithm may replace the AES key wrap algorithm in this encryption step. The encrypted data encryption key 408, a copy of the original key use fingerprint 406, and other additional information 401 may then form a key blob 409. The key blob 409 may contain several fields including the encrypted data encryption key 408, the unencrypted key use fingerprint 406, and additional information 401. There may be other fields in the key blob 409. Not all the fields in the key blob 409 need to be encrypted. FIG. 5 illustrates one exemplary programming structure embodiment of the key blob. The key management server and the HBA may support multiple formats of the key blob. The format of the data in the key blob may be indicated by a type parameter passed to the appropriate API functions of the key management server and/or the HBA.

Referring back to FIG. 4, the key blob 409 may then be passed from the key management server to the driver and stored in the memory of the server. When the driver issues a command to the HBA to initiate an I/O operation (e.g., to write data to a remote storage device B), the command may include information such as the target information, data information, and a key pointer. The key pointer points to the location of the key blob 409 in the server memory so that the HBA can retrieve the key blob 409 and extract the encrypted data encryption key 408, the key use fingerprint 406, and the additional information 401 from the key blob 409. The HBA may then use the AES key unwrap algorithm to decrypt the encrypted data encryption key 408. In some embodiments, the decrypted data encryption key and the attached key use fingerprint may be stored in some local cache memory of the HBA. If the driver later sends another command to the HBA for writing another block of data to the same target device and includes a key pointer in the command, the HBA can determine based on the key pointer whether the key has already been retrieved and unwrapped. If so, the unwrapping process does not have to be performed again. The key use fingerprint and the data encryption key are readily available in the cache memory of the HBA and can be retrieved when needed.

However, before the HBA can use the data encryption key 400 to encrypt I/O data, it first has to check to see if the data encryption key 400 is the correct key for this I/O operation. In this embodiment, the verification of the data encryption key 400 involves comparing the key use fingerprint 406 stored with the data encryption key 400 with another key use fingerprint independently generated by the HBA based on the pending I/O operation.

More specifically, when the driver receives an I/O request to transmit data from the server to a storage device on the network (e.g., storage device B), the I/O request is usually defined by certain parameters. In response to the I/O request, the driver issues a command to the HBA to prepare the requested data for transmission. In this embodiment, the command may include three different types of information: target information, data information, and a key pointer. In particular, target information may identify the target device to which the data is being transmitted. Data information may contain the location of the to-be-transmitted data in the server (e.g., a host memory address). The key pointer may point to the location of the data encryption key to be used to encrypt the outbound data. The location may be an address in the local cache of the server.

In this embodiment, the target information passed from the driver to the HBA contains the same target identifier, the LUN identifier, and the LBA range identifier that are used by the key management server to create the key use fingerprint. Because the hash function for generating the key use fingerprint is also available to the HBA, the firmware in the HBA can simply input the target information received from the driver into the hash function to independently generate a second key use fingerprint. The HBA can also retrieve from its cache memory the key use fingerprint that was extracted from the key blob and stored with the data encryption key, using the key pointer from the target information received from the driver. Because both of the key use fingerprints from the key blob and the second key use fingerprint generated by the HBA are based on the same target information for the particular I/O operation, the two key use fingerprints should match although they are created separately. Therefore, the HBA can compare the two key use fingerprints and determine whether the data encryption key is the correct key for the I/O operation. If the two key use fingerprints match, the data encryption key is the appropriate key to be used to encrypt the outbound data. If they do not match, it means that the data encryption key is corrupted or otherwise invalid or inappropriate and should not be used for this I/O operation.

Figure 6:
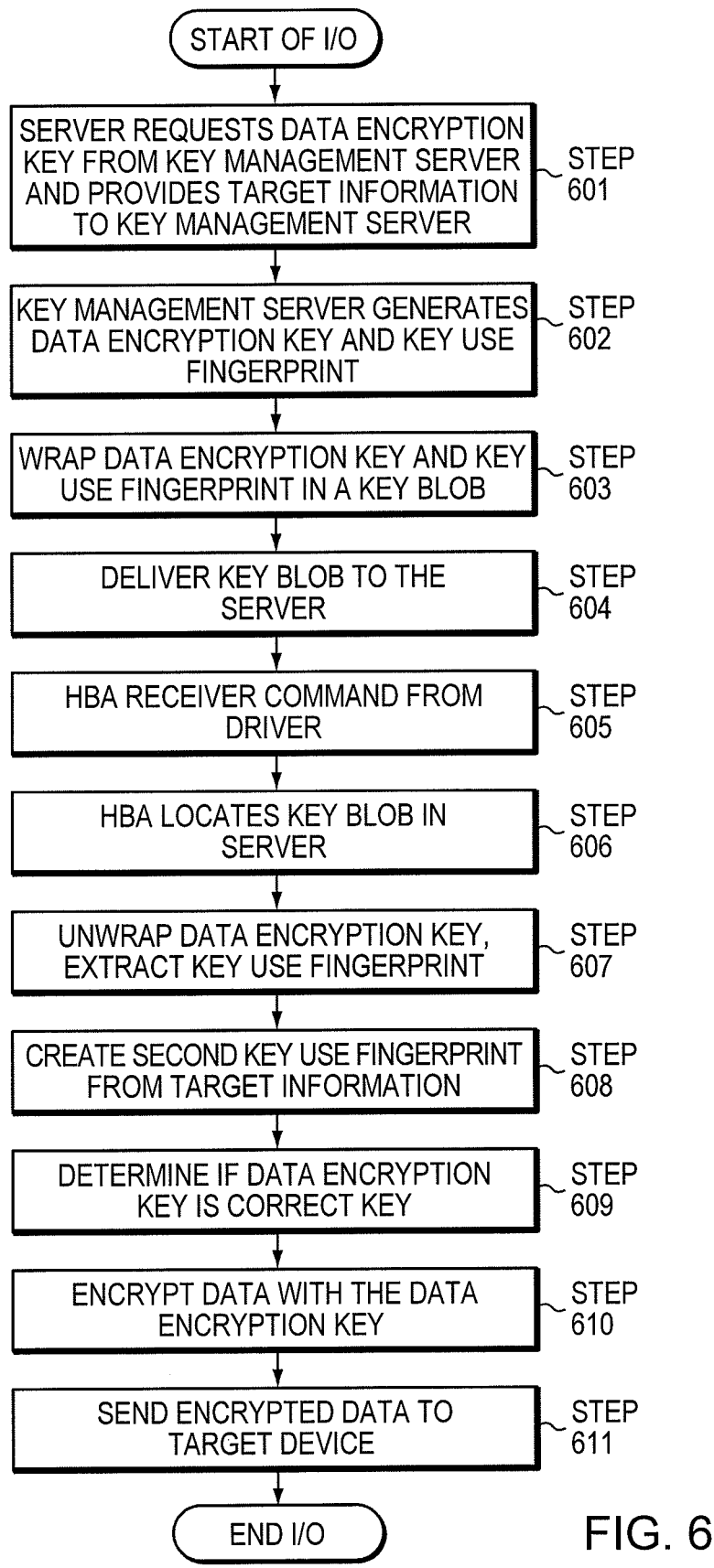
FIG. 6 captures exemplary steps in a data encryption key verification process according to an embodiment of the invention.

FIG. 6 captures the exemplary steps in the data encryption key verification process according to an embodiment of the invention. First, the server makes a key request to the key management server for a data encryption key and also provides a set of I/O target information that is to be associated with the key (step 601). In response to the request, the key management server generates a data encryption key and also creates a key use fingerprint based on the I/O target identifying information in the key request (step 602). The key management server then wraps the data encryption key using a key wrapping algorithm such as the AES key wrap algorithm and stores the wrapped key with key use fingerprint in a key blob (step 603). The key blob containing the encrypted data encryption key and a copy of unencrypted key use fingerprint is then delivered by the key management server to the server and stored in the memory of the server (step 604).

In addition to requesting the data encryption key from the key management server, the driver on the server also issues a command to the HBA to initiate the I/O operation (step 605). Included in the command is target information identifying the target device to which the data will be sent, data information identifying the location of the data to be sent, and a key pointer identifying the location of the data encryption key to be used to encrypt the data. The HBA locates the key blob in the server memory based on the key pointer (step 606). The data encryption key can be unwrapped using an unwrapping algorithm such as the AES key unwrap algorithm. In addition, the key use fingerprint can also be extracted from the blob (step 607). To verify that the unwrapped data encryption key is the correct key for the I/O operation, the HBA independently creates a second key use fingerprint from the target information received in the command from the driver (step 608). By comparing the key use fingerprint extracted from the key blob and the key use fingerprint created from the target information in the command, the HBA can determine whether the data encryption key is correct (step 609). The data information specifies to the HBA where to obtain the data from the server. If the two key use fingerprints match, the HBA proceeds with the I/O operation by encrypting the outgoing data with the data encryption key that it has unwrapped (step 610). Finally, the encrypted data is sent over the network fabric to the target device as defined in the I/O operation (step 611). The key use fingerprint checking is performed every time a data encryption key is to be used to encrypt or decrypt data.

It is essential that the unwrapping of the data encryption key be performed the very first time any key is used to encrypt the outgoing data. After a key has been unwrapped, it can be stored in the local cache inside the HBA along with the associated key use fingerprint. Subsequent encryption process using the same key then only needs to compare the generated key use fingerprint with the key use fingerprint that is stored along with the key to verify if the key specified by the driver is correct. Embodiments of the invention provide a method of protecting the data encryption key that is going to be used in the data transmission. More specifically, the embodiments utilize three parameters uniquely identifying the target device of the transmission to verify whether the data encryption key is corrupted before the data encryption key is used to encrypt the actual data. This disclosed method allows data to be protected from the originating server to the target device. The process is transparent to the driver and anything between where the key is generated (e.g., the key management server) and where the key is used (e.g., the HBA). Because the key use fingerprint is entrusted with information that is already possessed by the driver, there may not be a need for the driver to fetch additional information. Thus, it also minimizes the involvement of any DMA on the server by eliminating one or more DMA cycles from the I/O operations.

Figure 7:
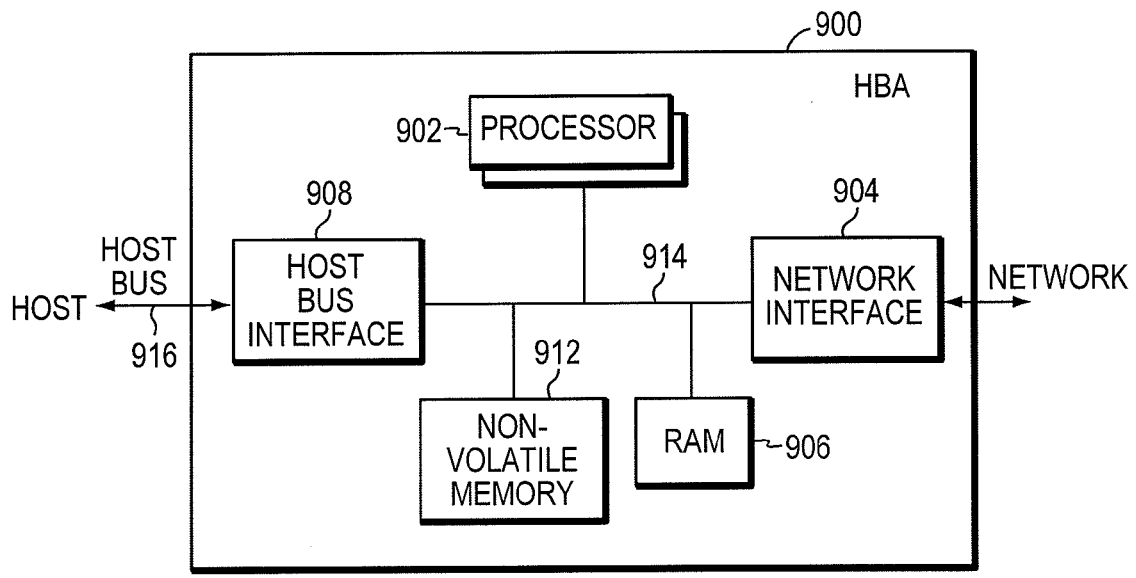
FIG. 7 illustrates an embodiment of an HBA adapted to perform the data encryption key verification method disclosed in the embodiments of the invention.

FIG. 7 illustrates an embodiment of the HBA adapted to perform the data encryption key verification method described above. As illustrated, the HBA 900 includes one or more processors 902, a network interface 904, a host bus interface 908, and computer readable storage media, such as Random Access Memory (RAM) 906 and non-volatile memory 912. The various components of the HBA 900 are all connected to a bus 914 in the HBA 900 and adapted to communicate with each other using the bus 914. The RAM 912 and the non-volatile memory 906 may be used to store firmware of the HBA 900 and other data. In other embodiments, the firmware may be stored on an external computer-readable storage medium such as a disk and loaded into the HBA 900 during operation. The host bus interface 908 connects the HBA 900 to its host via a host bus 910. The network interface 904 provides a gateway to an external network.

Figure 8:
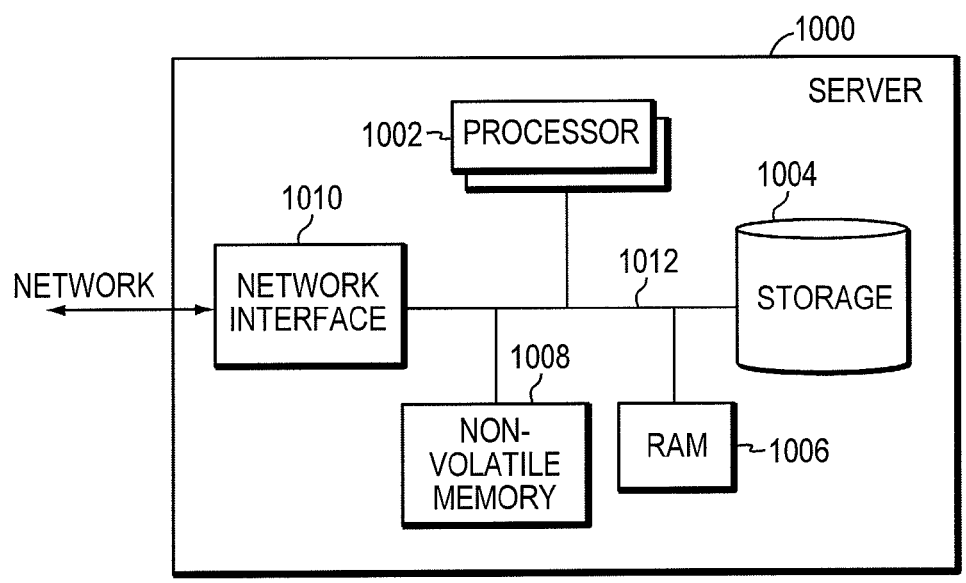
FIG. 8 illustrates an exemplary server according to an embodiment of the invention.

FIG. 8 illustrates an exemplary server according to an embodiment of the invention. The server 1000 includes one or more processors 1002, a storage device 1004, a network interface 1010, RAM 1006, and non-volatile memory 1008. The server 1000 may also include one or more device drivers and an HBA (not shown) as described above in view of FIG. 7. The processor 1002 may execute instructions stored in the RAM 1006 and the non-volatile memory 1008. The storage device 1004 may be a disk capable of storing programs such as firmware for the HBA. The host device is adapted to transmit and receive data from the network using the network interface 1010.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method comprising:
    sending a request for a data encryption key, the request including a combination of one or more identifiers, the combination associated with an I/O operation;
    receiving a data encryption key attached with a first key use fingerprint generated based on the combination associated with the I/O operation,
    independently generating a second key use fingerprint based on the combination associated with the I/O operation; and
    comparing the first and the second key use fingerprints to determine that the data encryption key is appropriate for the I/O operation.

2. The method of claim 1, wherein the one or more identifiers comprise a target identifier and a LUN identifier.

3. The method of claim 2, wherein the one or more identifiers further comprise a LBA range identifier.

4. The method of claim 2, wherein independently generating a second key use fingerprint further comprises applying a hash algorithm to the target identifier and the LUN identifier.

5. The method of claim 4, wherein independently generating a second key use fingerprint further comprises applying the hash algorithm to a LBA range identifier.

6. The method of claim 4, wherein applying the hash algorithm further comprises:
concatenating the target identifier and the LUN identifier to generate an intermediate identifier; and
hashing the intermediate identifier.

7. The method of claim 6, wherein applying the hash algorithm further comprises concatenating a LBA range identifier to the hashed intermediate identifier.

8. The method of claim 2, wherein independently generating a second key use fingerprint further comprises:
concatenating the target identifier and the LUN identifier; and
calculating a CRC on the concatenated target identifier and the LUN identifier.

9. The method of claim 8, wherein independently generating a second key use fingerprint further comprises concatenating a LBA range identifier to the CRC.

10. The method of claim 1, wherein the first key use fingerprint and the second key use fingerprint are generated using a common formula.

11. The method of claim 1, wherein the received data encryption key is encrypted.

12. The method of claim 11, further comprising decrypting and storing the received encrypted data encryption key.

13. A non-transitory machine-readable storage medium comprising instructions that, when executed by one or more processors, cause a machine to perform operations comprising:
requesting a data encryption key, the request including a combination of one or more identifiers, the combination associated with an I/O operation;
receiving a data encryption key attached with a first key use fingerprint generated based on the combination associated with the I/O operation,
independently generating a second key use fingerprint based on the combination associated with the I/O operation;
comparing the first and the second key use fingerprints to determine that the data encryption key is appropriate for the I/O operation.

14. The non-transitory machine-readable storage medium of claim 13, wherein the one or more identifiers comprise a target identifier and a LUN identifier.

15. The non-transitory machine-readable storage medium of claim 14, wherein the one or more identifiers further comprise a LBA range identifier.

16. The non-transitory machine-readable storage medium of claim 14, wherein independently generating a second key use fingerprint further comprises applying a hash algorithm to the target identifier and LUN identifier.

17. The non-transitory machine-readable storage medium of claim 16, wherein independently generating a second key use fingerprint further comprises applying the hash algorithm to a LBA range identifier.

18. The non-transitory machine-readable storage medium of claim 16, wherein applying the hash algorithm further comprises:
concatenating the target identifier and the LUN identifier to generate an intermediate identifier; and
hashing the intermediate identifier.

19. The non-transitory machine-readable storage medium of claim 18, wherein applying the hash algorithm further comprises concatenating a LBA range identifier to the hashed intermediate identifier.

20. The non-transitory machine-readable storage medium of claim 14, wherein independently generating a second key use fingerprint further comprises:
concatenating the target identifier and the LUN identifier; and
calculating a CRC on the concatenated target identifier and the LUN identifier.

21. The non-transitory machine-readable storage medium of claim 20, wherein independently generating a second key use fingerprint further comprises concatenating a LBA range identifier to the CRC.

22. The non-transitory machine-readable storage medium of claim 13, wherein the first key use fingerprint and the second key use fingerprint are generated using a common formula.

23. The non-transitory machine-readable storage medium of claim 13, wherein the received data encryption key is encrypted.

24. The non-transitory machine-readable storage medium of claim 23, further comprising decrypting and storing the received encrypted data encryption key.

25. A key management server in communication with a server, the key management server adapted for:
receiving a request for a data encryption key from the server, the request including a combination of one or more identifiers, the combination associated with an I/O operation;
generating the data encryption key;
generating a key use fingerprint based on the combination associated with the I/O operation;
encrypting the data encryption key;
sending the encrypted data encryption key and the key use fingerprint to the server.

26. The key management server of claim 25, wherein the one or more identifiers comprise a target identifier and a LUN identifier.

27. The key management server of claim 26, wherein the one or more identifiers further comprise a LBA range identifier.

28. The key management server of claim 26, wherein creating generating a key use fingerprint further comprises applying a hash algorithm to the target identifier and the LUN identifier.

29. The key management server of claim 28, wherein creating generating a key use fingerprint further comprises applying the hash algorithm to a LBA range identifier.

30. The key management server of claim 28, wherein applying the hash algorithm further comprises: concatenating the target identifier and the LUN identifier to generate an intermediate identifier; and hashing the intermediate identifier.

31. The key management server of claim 30, wherein applying the hash algorithm further comprises concatenating a LBA range identifier to the hashed intermediate identifier.

32. The key management server of claim 25, the key management server further adapted for encrypting the data encryption key using a key-encryption key.

33. A non-transitory machine-readable storage medium comprising instructions that, when executed by one or more processors cause a machine to perform operations comprising:
- receiving a request for a data encryption key from the server, the request including a combination of one or more identifiers, the combination associated with unique to an I/O operation;
- generating the data encryption key;
- generating a key use fingerprint based on the combination associated with the I/O operation;
- encrypting the data encryption key;
- sending the encrypted data encryption key and the key use fingerprint to the server.

34. The non-transitory machine-readable storage medium of claim 33, wherein the one or more identifiers comprise a target identifier and a LUN identifier.

35. The non-transitory machine-readable storage medium of claim 34, wherein the one or more identifiers further comprise a LBA range identifier.

36. The non-transitory machine-readable storage medium of claim 35, wherein generating a key use fingerprint further comprises applying a hash algorithm to the target identifier, LUN identifier, and LBA range identifier.

37. The non-transitory machine-readable storage medium of claim 33, comprising instructions that, when executed by one or more processors cause the machine to perform operations further comprising encrypting the data encryption key using a key-encryption key.

38. A server in communication with a key management server, the server adapted for:
- sending to the key management server a request for a data encryption key, the request including a combination of one or more identifiers, the combination associated with an I/O operation;
- receiving from the key management server a data encryption key attached with a first key use fingerprint generated based on the combination associated with the I/O operation,
- independently generating a second key use fingerprint based on the combination associated with the I/O operation;
- comparing the first and the second key use fingerprint to determine that the data encryption key is appropriate for the I/O operation.

39. The server of claim 38, wherein the one or more identifiers comprise a target identifier and a LUN identifier.

40. The server of claim 39, wherein the one or more identifiers further comprise a LBA range identifier.

41. The server of claim 39, wherein independently generating a second key use fingerprint further comprises applying a hash algorithm to the target identifier and the LUN identifier.

42. The server of claim 41, wherein independently generating a second key use fingerprint further comprises applying the hash algorithm to a LBA range identifier.

43. The server of claim 41, wherein applying the hash algorithm further comprises:
- concatenating the target identifier and the LUN identifier to generate an intermediate identifier; and
- hashing the intermediate identifier.

44. The server of claim 43, wherein applying the hash algorithm further comprises concatenating a LBA range identifier to the hashed intermediate identifier.

45. The server of claim 39, wherein independently generating a second key use fingerprint further comprises:
- concatenating the target identifier and the LUN identifier; and
- calculating a CRC from the concatenated target identifier and the LUN identifier.

46. The server of claim 45, wherein independently generating a second key user fingerprint further comprises concatenating the LBA range identifier to the CRC.

47. The server of claim 38, the server further adapted for generating the first key use fingerprint and the second key use fingerprint using a common formula.

48. The server of claim 38, the server further adapted for receiving an encrypted data encryption key from the key management server.

49. The server of claim 48, the server further adapted for decrypting the encrypted data encryption key; and storing the decrypted data encryption key on the server.

50. An apparatus in communication with a driver in a server, the apparatus adapted for:
- receiving a command to execute an I/O operation, the command comprising target information identifying a target device associated with the I/O operation, data information identifying data to be sent to the target device in the I/O operation, and a key pointer identifying a location of a data encryption key and a first key use fingerprint in the server, the first key use fingerprint generated based on a combination of one or more identifiers, the combination associated with the I/O operation;
- extracting the data encryption key and the first key use fingerprint from the location identified by the key pointer;
- generating a second key use fingerprint based on the combination associated with the I/O operation; and
- determining whether the data encryption key is appropriate for the I/O operation by comparing the first key use fingerprint and the second key use fingerprint.

51. The apparatus of claim 50, wherein the one or more identifiers comprises a target identifier and a LUN identifier.

52. The apparatus of claim 51, wherein the one or more identifiers further comprise a LBA range identifier.

53. The apparatus of claim 51, wherein generating a second key use fingerprint further comprises applying a hash algorithm to the target identifier and the LUN identifier.

54. The apparatus of claim 53, wherein generating a second key use fingerprint further comprises applying the hash algorithm to a LBA range identifier.

55. The apparatus of claim 53, wherein applying the hash algorithm further comprises:
- concatenating the target identifier and the LUN identifier to generate an intermediate identifier; and
- hashing the intermediate identifier.

56. The apparatus of claim 55, wherein applying the hash algorithm further comprises concatenating a LBA range identifier to the hashed intermediate identifier.

57. The apparatus of claim 51, wherein generating a second key use fingerprint further comprises:
- concatenating the target identifier and the LUN identifier; and
- calculating a CRC from the concatenated target identifier and the LUN identifier.

58. The apparatus of claim 57, wherein generating a second key use fingerprint further comprises concatenating a LBA range identifier to the CRC.

59. The apparatus of claim 50, the apparatus further adapted for generating the first key use fingerprint and the second key use fingerprint using a common formula.

60. The apparatus of claim 50, the apparatus further adapted for encrypting the data encryption key when received from the key management server.

61. The apparatus of claim 60, the apparatus further adapted for decrypting the encrypted data encryption key and storing the decrypted data encryption key on the server.

62. A method comprising:
generating a key use fingerprint based on a combination of one or more identifiers, the combination associated with an I/O operation, provided by the key- requesting server;
appending the key use fingerprint to the data encryption key;
wrapping the data encryption key and the key use fingerprint in a key blob using a key wrapping algorithm; and
sending the key blob from the key management server to the key-requesting server.

63. The method of claim 1, further comprising using the data encryption key to encrypt data.

64. The method of claim 1, further comprising using the data encryption key to decrypt data.

65. The non-transitory machine-readable storage medium of claim 13, the operations further comprising using the data encryption key to encrypt data.

66. The non-transitory machine-readable storage medium of claim 13, the operations further comprising using the data encryption key to decrypt data.

67. The server of claim 38, further adapted for using the data encryption key to encrypt data.

68. The server of claim 38, further adapted for using the data encryption key to decrypt data.

69. The apparatus of claim 50, further adapted for obtaining data from the server based on the data information and encrypting the data using the extracted data encryption key.

* * * * *